United States Patent [19]

Afsenius

[11] Patent Number: 4,826,302
[45] Date of Patent: May 2, 1989

[54] IMAGE INTENSIFIER BINOCULAR

[75] Inventor: Sven-Åke Afsenius, Lidingö, Sweden

[73] Assignee: Simrad Optronics A/S, Oslo, Norway

[21] Appl. No.: 43,554

[22] PCT Filed: Jul. 11, 1986

[86] PCT No.: PCT/SE86/00334
§ 371 Date: Mar. 19, 1987
§ 102(e) Date: Mar. 19, 1987

[87] PCT Pub. No.: WO87/00639
PCT Pub. Date: Jan. 29, 1987

[30] Foreign Application Priority Data

Jul. 19, 1985 [SE] Sweden .............................. 8503533

[51] Int. Cl.$^4$ ...................... G02B 23/00; G02B 23/02; G02B 27/14
[52] U.S. Cl. .................... 350/538; 350/557; 350/569; 350/145; 350/173
[58] Field of Search ................ 350/538, 1.2, 508, 557, 350/569, 1.3, 1.4, 145, 173

[56] References Cited

U.S. PATENT DOCUMENTS

| | | | |
|---|---|---|---|
| 3,195,404 | 7/1965 | Bouwers | 350/538 |
| 4,467,190 | 8/1984 | Hadani | 350/538 |
| 4,653,879 | 3/1987 | Filipovich | 350/1.2 |
| 4,737,023 | 4/1988 | Kastendieck et al. | 350/538 |

FOREIGN PATENT DOCUMENTS

| | | | |
|---|---|---|---|
| 2704185 | 3/1978 | Fed. Rep. of Germany | |
| 0011045 | 1/1977 | Japan | 350/557 |
| 2065325 | 6/1981 | United Kingdom | 350/538 |

Primary Examiner—John K. Corbin
Assistant Examiner—Ronald M. Kachmarik
Attorney, Agent, or Firm—Pollock, Vande Sande & Priddy

[57] ABSTRACT

Method of designing a compact binocular night vision instrument with an electronic image intensifier (2) which is oriented so that its symmetry axis forms a right angle with the line of sight (19) between the night vision binocular and the scene to be observed. The total forward length thereby becomes particularly short, thus reducing the downward torque which is troublesome when the night vision binocular is carried like a pair of spectacles, attached to the head (generally called night vision goggles). The total forward length may be even further reduced if the symmetry axis of the objective lens (1) is also at right angles with the line of sight (19). These measures makes feasible a simple beam splitter system where the optical axis through one of the eye pieces (13B) intersects the common optical axis beam splitter (14), and to design an instrument enclosed in a single housing having a smooth exterior shape which is easy to grasp.

3 Claims, 1 Drawing Sheet

IMAGE INTENSIFIER BINOCULAR

BACKGROUND OF THE INVENTION

Electronic nightvision devices, where a scene is projected by a fast objective lens on the photo-cathode of an image intensifier and where a phosphorous screen of the same intensifier is viewed through a magnifier or a microscope, are used in the dark, with the night sky and the stars as the only illumination.

Such an instrument may have one eyepiece or it may be binocular, whereby the light from the phosporous screen is divided by a beam splitter to two eyepieces so that the observer may watch the phosphorous screen with both eyes. The device may be designed for handheld use—usually with several times magnification—or it may be fitted to the head like spectacles or attached to a helmet. In this latter application the device is called night visiion goggles, usually with unit magnification so that the observer is viewing the night scene in natural scale.

Since the observer in many applications must carry the night vision goggles for extended time periods, it is particularly important that they be as light as possible and that they not protrude unnecessarily in front of the observer, because the associated downward torque would cause neck strain. However, the components of the goggles objective lens, image intensifier tube, microscope unit, batteries etc.—are by necessity comparatively heavy and are according to prevailing design principles, so oriented that the whole device protrudes about 12–20 cm in front of the eyes of the observer. The experience with such an instrument is often that the front weight is embarrassing: Furthest away from the observer is a fast and thus comparatively heavy objective lens, followed by an image intensifier and finally a binocular microscope system with a beam splitter closest to the observer. The optical axis through the objective lens and the image intensifier are thus parallel with the line of sight against the scene being viewed.

SUMMARY OF THE INVENTION

According to the invention, the optical axis of the image intensifier and possibly also the optical axis of the objective lens are oriented at right angles relative to the line of sight. Through this simple measure, the length of the device in front of the observer is significantly reduced to about 6 cm, i.e., less than half of a conventional design. The center of gravity is moved correspondingly closer to the observer, which makes it considerably easier to carry the night vision goggles without observer fatigue, this being the main purpose of the invention.

The invention furthermore enables significant simplification of the design of the binocular microscope system through which the phosphorous screen is being viewed: The orientation of the image intensifier in a horizontal plane and at right angles relative to the line of sight makes the entrance of rays into the microscope asymmetric in relation to the observer, i.e., from the side of the instrument. This fact makes it feasible to arrange a more efficient beam splitter system with very few optical components.

Conventional nightvision goggles have symmetric microscope systems such that the rays from the image intensifier enter the microscope viewing system at the center. Such an arrangement necessitates the use of a larger number of optical components than is the case according to the invention.

BRIEF DESCRIPTION OF THE DRAWINGS

The single FIGURE shows an exemplary embodiment of the invention. The instrument has the approximate shape of a horizontal bar having a substantially rectangular profile in front of the eyes of the observer. The instrument lacks such delicate protruding details as the objective lens. The binocular microscope system, including the eyepieces 13A and 13B, is located in the same horizontal plane as the eyes of the observer. The objective lens 1 and the image intensifier 2 are located in a plane immediately above. The largest dimension of the instrument is along a horizontal direction from side to side, where it however does not collide with an eventual helmet (in a vertical direction), nor creates any annoying torque (in a forward direction along the line of sight).

The two eyepieces 13A and 13B, the beam splitter prism 14, the eyepiece prisms 15 and 16, the collimator lens 7 and the transport lens 8 are all located in the lower plane.

Figure 1:
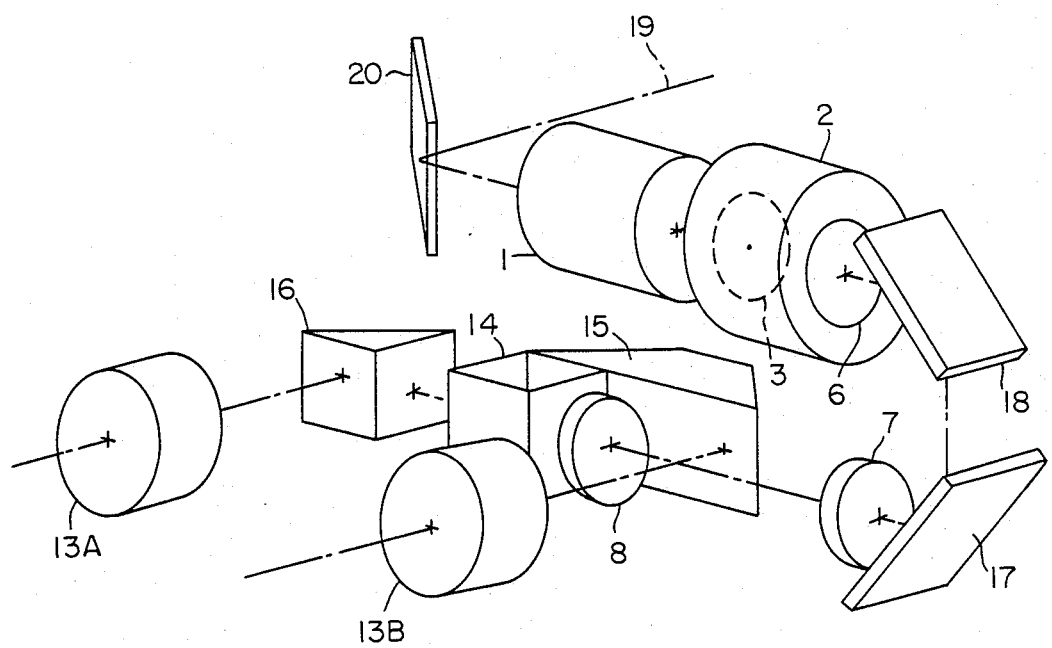

The collimator lens 7 projects the image intensifier screen 6 at infinite image distance while the transport lens 8 thereafter focuses the rays on the image planes of the eyepieces 13A and 13B after the ray partition in the beam splitter prism 14. The light between the screen 6 and the collimator lens 7 is transferred by way of the two mirrors or prisms 17,18. These enable the image intensifier 2 to be located above the microscope system so that the optical axes through the image intensifier and the common ray portion of the microscope define a plane at right angles to the line of sight 19.

The mirrors 17 and 18 may, however, be twisted so that the microscope instead comes above or on the side of the image intensifier 2.

The selected beam splitter 14 allows large exit pupils to be used and reflects part of the light beam in a direction away from the observer. The eyepiece prism 15 will, however, reflect this same light beam two more times, causing it to intersect a line defined by the common optical axis of the microscope through the beam splitter prism 14. This light beam finally passes the eyepiece 13B to one eye of the observer.

That light beam being transmitted through the beam splitter 14 will reach the second eyepiece 13A via a single reflection in the prism or mirror 16.

In front of the image intensifier tube 2, the objective lens 1 is located, which via the mirror or prims 20 projects an image of the scene on the photocathode 3. This scene to be watched is located on the line of sight 19 leaving the instrument.

In some applications—as when it is desirable to increase the objective lens 1 diameter or locate it in a symmetric position between the eyes—it can be advantageous to place the mirror or prism 20 between objective lens 1 and photocathode 3. The optical axis of the objective will in thise case coincide with the line of sight 19. The prism or mirror 20 may alternatively be positioned within the objective lens 1. It may also be advantageous to let the axis through the image intensifier 2 deviate from the horizontal plane, however maintaining the right angles relative to the line of sight 19.

The beam splitter 14 may be arranged in several other ways, for example, it may be located between lenses 7 and 8.

The design shown and described is thus different from other night vision goggles, being more compact—particularly forward along the line of sight. It is consequently easier to fit on the head or in a helmet, while at the same time the observer gets less tired during prolonged use. The night vision goggles according to the invention are moreover less costly to produce because the optical components included are comparatively few and all of them are assembled inside a single housing.

I claim:

1. An image intensifier binocular which is susceptible of being carried on the head, and comprising a light intensifier (2) having an entrance plane (3) and an exit plane (6) for obtaining a light-intensive image of a scene projected onto the entrance plane, an objective (1) for projecting a scene from the line of sight (19) of the binocular onto the entrance plane, and an observing-microscope with beam-splitter (14) for observing through two oculars the said image obtained at the exit plane of the light intensifier, wherein the axis of symmetry of the light intensifier is at a right angle to the line of sight (19) and oriented horizontally, the binocular microscope (13A, 13B, 7, 8, 14–16) for observing the exit plane of the light intensifier (6) has a ray-path portion common to both oculars (13A, 13B), which common ray-path portion defines, together with the axis of symmetry of the light intensifier (2), a plane perpendicular to the line of sight (19), and the light-ray entrance of the microscope is asymmetric relative to an observer, a first split ray-path portion transmitted by the beam-splitter (14) being directed, after a 90° reflection (16), toward one of said oculars (13A), whereas a second split ray-path portion deviated by 90° by the beam-splitter intersects, after two further reflections, the said common ray-path portion before passing to the other of said oculars (13B).

2. An image intensifier binocular according to claim 1, wherein the objective (1) is mounted with its axis coincident with the axis of symmetry of the light intensifier, a mirror (20) being mounted in front of the objective in order to obtain the outgong line of sight (19) perpendicular to the axis of symmetry of the light intensifier.

3. An image intensifier binocular according to claim 1, having magnification of unity, such that an observer will observe the scene in natural scale.

* * * * *